June 11, 1935.  J. MICHAL  2,004,470
FOOT CONTROL FOR BABY CARRIAGES
Filed Aug. 25, 1933
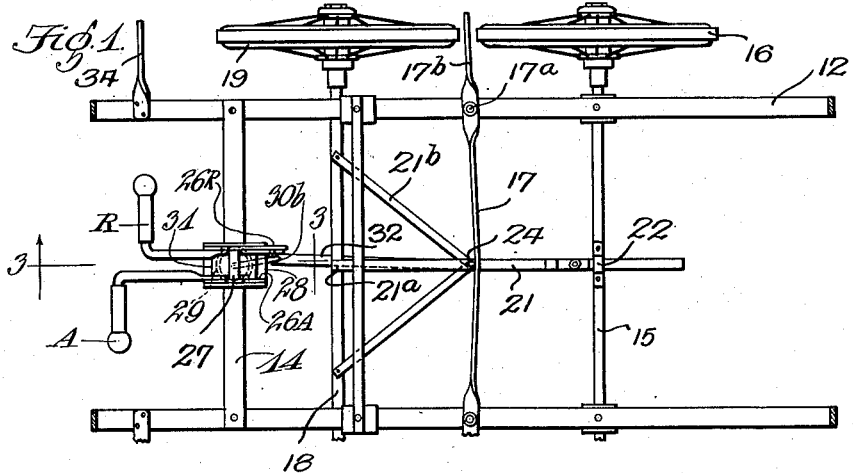
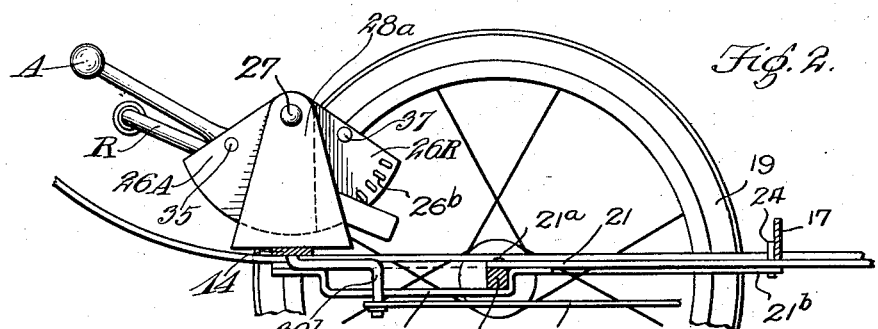
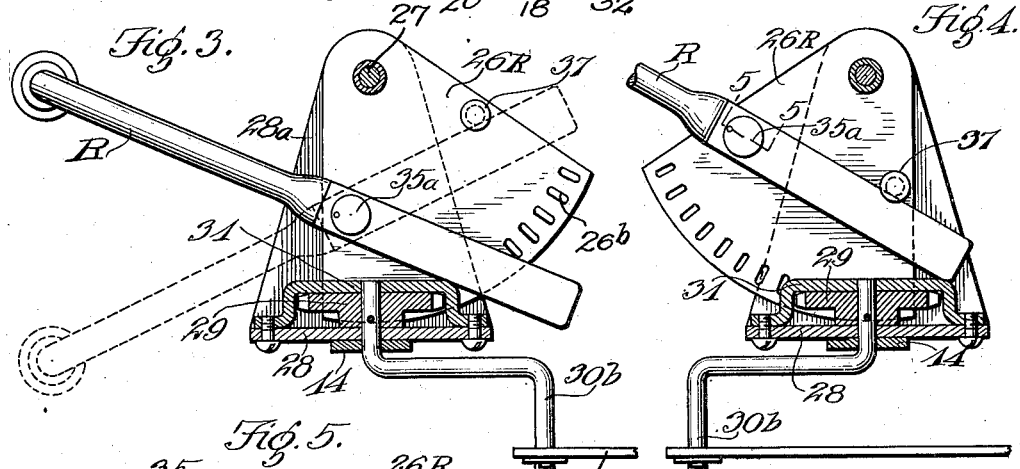
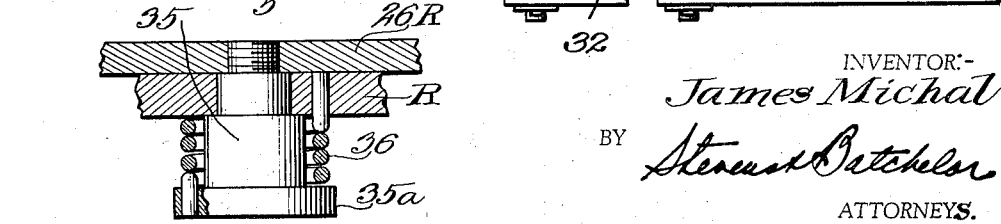
INVENTOR:—
James Michal
BY
Stewart Batchelor
ATTORNEYS.

Patented June 11, 1935

2,004,470

UNITED STATES PATENT OFFICE 2,004,470

FOOT CONTROL FOR BABY CARRIAGES

James Michal, Chicago, Ill., assignor to Storkline Furniture Corporation, Chicago, Ill.

Application August 25, 1933, Serial No. 686,843

1 Claim. (Cl. 280—47)

My invention relates to stabilizing means for baby carriages, and more particularly to the foot control for the same, and constitutes an improvement over the control illustrated and described in my patent application, Serial No. 622,493, filed July 14, 1932 and patented September 11, 1934, as Patent No. 1,973,352.

The main object of the improved control is to maintain the actuating pedals thereof in poised or elevated position during the normal position or travel of the baby carriage, in order that such pedals may not be impeded or interfered with by objects or inequalities along the path of the vehicle, such as steps, sidewalk curbs or pavement obstructions.

Another object of the improvement is to place the actuating pedals for the foot control at normal positions which are easily accessible and may readily become familiarized, whereby to enable the attendant to operate the pedals without particular attention.

An additional object of the invention is to construct the improved control on lines of simplicity and so strong and firm that it may operate at all times without need of adjustment or repair.

With the above objects in view and any others that may suggest themselves from the specification and claim to follow, a better understanding of the invention may be had by reference to the accompanying drawing, in which—

Fig. 1 is a plan view of a portion of the carriage frame and showing the novel control in normal position;

Fig. 2 is an enlarged section showing the control in elevation;

Fig. 3 is an enlarged section on the line 3—3 of Fig. 1, also showing the normal position of the control;

Fig. 4 is a view similar to Fig. 3, showing the control in a different position; and Fig. 5 is an enlarged section on the line 5—5 of Fig. 4.

In the present case, the general chassis structure of the baby carriage is the same as in the former case, as are the fundamental parts entering into the foot control mechanism. Thus, the cross strap 14 of the carriage frame receives first the base plate 28, then the horizontal gear 29 and finally the retainer strap 31, the gear carrying the crank 30b whose forward position represents the normal operation of the carriage. Such operation requires the rear axle 18 of the carriage to be in the forward position shown, locating the rear wheels 19 close behind the front wheels 16. The connections between the crank 30b and the rear axle commence with a connecting bar 32 which makes a pivotal connection at its rear end with the crank and at its front with a pin 24 depending from the front end of a longitudinal bar 21 slidable in a bearing 22 carried by the front axle 15. The bar 21 is secured at its rear end by a rivet 21a to the rear axle, and is also rigidly connected to the latter by diagonal braces 21b. When the rear axle is in the forward position shown, the upper portion of the pin 24 flexes the medial portion 17 of a beam pivoted at 17a to the sides 12 of the carriage to retract the brake end portions 17b of the beam from the front wheels 16. When the crank is swung around to rearward position, it draws the rear axle backward in guide straps 20, urging the rear wheels against a pair of stationary brakes 34 outwardly projected from the carriage frame sides. As in the previous case, a pair of laterally-spaced foot pedals R and A are provided, these being secured by rivets inside a set of sector plates 26R and 26A, which are journaled in a shaft 27, the latter being fast in upstanding sides 28a of the base plate 28. The sector plates are formed with an arcuate series of perforations 26b near their peripheries and meshing on opposite sides with the teeth of the gear 29. The sector plates are thus interconnected for travel in opposite directions, and the effect of this relation is to carry the foot pedals R and A correspondingly. Thus, when one of the pedals is depressed, the other rises, and vice versa.

With the above situation in my previous case, one pedal was always in a low position, and when the carriage was in motion, such pedal was in the way of steps, sidewalk curbs or ground inequalities along the course of the vehicle, hindering the progress of the same. In designing the improved control, I have arranged the same with both pedals in elevated position during the normal operation of the carriage, and only the pedal A in the depressed position when the brakes are on. Obviously, the pendent position of the pedal in this event can do no harm or cause any inconvenience as the carriage is stationary.

Considering the pedal A, its position and action will not change in my present embodiment from the old case, and during the normal operation of the carriage this pedal appears as in Fig. 2, in poised position, its sector plate 26A being swung to project in a left hand direction from the support 28A apparent in Fig. 2. With the pedal A considered in this position, it will be seen that the pedal R while almost in a similar relative position, is actually differently positioned relative to its sector plate 26R. This position is distinguished from the one in my previous case by the fact that in such case the pedal R would appear deflected downwardly, whereas in the present case it appears poised.

The connection of the pedal R whereby it assumes the position just mentioned is made by means of a post 35 projecting inwardly from the sector plate 26R and having a terminal head 35A. This post is located near the left hand edge of the plate as viewed in the drawing and suggested by the left-hand rivet 26a in my previous case. The shank of the pedal R is freely pivoted on the post 35; and the latter receives a torsion spring 36 whose ends are secured in the head of the post and pedal shank respectively and with a tension to swing the latter in a clockwise direction. Thus, the pedal is normally swung with its shank resting against the right-hand corner of the strap 31 as a limit, as clearly shown in Fig. 3. However, the pedal may be depressed against the tension of the spring to the position indicated by dotted lines in such figure, in which event its shank will meet a pin 37 near the opposite edge of the sector plate as a limit, such pin having the relative position of the right-hand rivet 26a in my previous case.

In the operation of the new development, the parts are considered in the positions shown as the carriage is normally operated. However, when the carriage is to be locked in stationary position, the pedal A is depressed and secures the desired result as in the previous case. However, this action in causing the sector plate 26R to swing toward the left has lowered the pin 37 thereof to the extent of meeting the shank of the pedal R, as clearly shown in Fig. 4.

The parts of the control remain in the positions just described, as long as the carriage is locked. However, when the brakes are desired to be released, the attendant steps on the pedal R, which procures the right-hand swing of the sector plate 26R through the fact that the pedal is in positive connection with such sector plate by the impinging action of its shank on the pin 37. Thus, the reverse action of the control is procured, restoring the carriage to normal position. Now, the pedal R is down while the opposite portion of its shank is relatively high above the corner of the strap from which it has swung, as indicated by dotted lines in Fig. 3. At the same time, the pedal is being held under the tension of its spring 36. Now, when the foot is removed from the pedal, the spring serves to swing the shank thereof in a clockwise direction without affecting the position of the sector plate 26R, so that the pedal again assumes the position of Figs. 2 and 3, remaining poised during the operation of the carriage and during the locked position thereof, only to be depressed momentarily while the brakes are released.

It will be seen that, by means of the improved control, both actuating pedals are in poised position during the normal operation of the carriage, and are therefore out of the way of any impediment or projection along the course of travel. Yet, the actuation of the pedals has not been changed from the previous instance as far as the attendant's attention is concerned, as the pedals have the same functions as heretofore. Finally, it will be appreciated that the improvement is extremely simple, does not take up extra room and is of a nature to operate efficiently and dependably for an indefinite period without any attention or repair.

I claim:

A carriage having an axle, a gearing for shifting the latter forth and back, dual foot levers depressible individually for the control of said gearing to procure the respective axle movements, oppositely-swingable sectors operated by the gearing and carrying the respective levers, the action of the sectors raising either lever when the other is depressed, means fixedly attaching one lever and pivotally attaching the other lever to the sectors relating thereto, and a torsion spring coiled about the pivot and connected with its ends to said other lever and its sector respectively, the spring automatically raising the related lever from the depressed position when such lever is released.

JAMES MICHAL.